(12) United States Patent
Hosota

(10) Patent No.: US 7,636,211 B2
(45) Date of Patent: Dec. 22, 2009

(54) LENS UNIT

(75) Inventor: Hiroshi Hosota, Ikoma (JP)

(73) Assignee: Konica Minolta Opto, Inc., Tokyo (JP)

( * ) Notice: Subject to any disclaimer, the term of this patent is extended or adjusted under 35 U.S.C. 154(b) by 36 days.

(21) Appl. No.: 12/084,720

(22) PCT Filed: Oct. 18, 2006

(86) PCT No.: PCT/JP2006/320710

§ 371 (c)(1),
(2), (4) Date: May 8, 2008

(87) PCT Pub. No.: WO2007/055085

PCT Pub. Date: May 18, 2007

(65) Prior Publication Data

US 2009/0141374 A1 Jun. 4, 2009

(30) Foreign Application Priority Data

Nov. 11, 2005 (JP) ............................. 2005-326830

(51) Int. Cl.
*G02B 7/02* (2006.01)
(52) U.S. Cl. ...................................... 359/824; 359/819
(58) Field of Classification Search ................ 359/811, 359/813, 814, 819, 821–824
See application file for complete search history.

(56) References Cited

U.S. PATENT DOCUMENTS 7,016,123 B2   3/2006   Yano
7,573,660 B2 * 8/2009   Chang .......................... 359/822
2005/0134976 A1   6/2005   Yano

FOREIGN PATENT DOCUMENTS

| JP | 2001-264616 A | 9/2001 |
| JP | 2002-006364 | 1/2002 |
| JP | 2005-156649 A | 6/2005 |
| JP | 2005-156853 A | 6/2005 |
| JP | 2005-292355 A | 10/2005 |
| JP | 2005-300941 A | 10/2005 |
| WO | WO 2007/055085 A1 | 5/2007 |

OTHER PUBLICATIONS

International Search Report in International Application No. PCT/JP2006/320710, dated Jan. 16, 2007, 4 pages.

\* cited by examiner

*Primary Examiner*—Timothy J Thompson
(74) *Attorney, Agent, or Firm*—Brinks Hofer Gilson & Lione

(57) ABSTRACT

A lens unit, despite its having a lens driving device that drives a lens and an optical path control device that controls an optical path, providing stable lens drive and reduction in size. The lens unit (1) includes a lens holder (4) for holding the lens (3); the lens driving device (9) for moving the lens holder (4) along an optical axis (x); and the optical path control device (5) having optical path control member drive sections (11, 12) fixed to the lens holder (4) and individually driving the optical path control members (18, 19, 20). The optical path control member drive section (11, 12) are arranged spaced from each other, and the lens driving device (9) is placed penetrating between the optical path control member drive sections (11, 12).

7 Claims, 3 Drawing Sheets

LENS UNIT

TECHNICAL FIELD

The present invention relates to a lens unit, particularly to a compact lens unit built in a mobile phone and others.

BACKGROUND ART

Many of the mobile phones and PDAs (Personal Digital Assistants) have a built-in lens unit and camera function. In recent years, a compact lens unit has been introduced into the market, which incorporates an optical path control device such as a mechanical shutter and diaphragm, and a lens driving device to drive the lens for optical zooming and focusing.

The optical path control device is characterized by an increased size and weight of the drive section that includes a drive source such as a solenoid to drive the optical path control member such as a shutter blade. The lens driving device is generally installed on the opposite side of the lens with the optical axis sandwiched in-between, for the purpose of avoiding possible interference with the drive section of the optical path control device. Thus, because the center of gravity of the optical path control device is far away from the drive apparatus, there is a problem that the drive of the lens is apt to be unstable by the torsion resulting from the inertia of the optical path control device when the lens is driven. In addition to this problem, there has been a problem of poor space efficiency and failure of downsizing the lens unit because the drive section of the optical path control device and the lens driving device are installed on the opposite sides of the lens.

Patent Document 1: Unexamined-Japanese Patent Application Publication No. 2002-6364

DISCLOSURE OF INVENTION

Object of the Invention

An object of the present invention is to solve the aforementioned problems and to provide a lens unit characterized by stable lens drive and compact configuration, including a lens driving device for driving a lens and an optical path control device.

Means for Solving the Object

To solve the aforementioned problems, a lens unit of the present invention comprises:
  a lens holder which holds a lens;
  a lens driving device for driving the lens holder along an optical axis; and
  an optical path control device including a plurality of optical path control member drive sections for each driving an optical path control member, the optical path control device being secured to the lens holder,
    wherein the plurality of optical path control member drive sections are arranged with a space therebetween, and the lens driving device is disposed so as to extend through between the plurality of optical path control member drive sections.

In the aforementioned structure, the optical path control member driving sections, which have a greater mass in the optical path control device, are installed apart from each other, and the lens driving device is arranged so as to pass through between the optical path control member drive sections. This arrangement allows the center of gravity of the optical path control member to be placed close to the lens driving device. This ensures stable lens traveling because not much torsion is applied to the lens driving device. Further, the member projectingly provided on the lens holder and directly driven by the lens driving device is arranged to overlap the optical path control device on the same side of the lens. This arrangement provides enhanced space efficiency and allows the lens unit to be downsized.

In the lens unit of the present invention, two of the optical path control members are provided. The aforementioned optical path control member drive sections are installed at a position sandwiching the straight line connecting the optical axis and lens driving device.

In this structure, two optical path control members and lens driving device are not arranged in the radial direction of the lens, and therefore, can be placed close to the lens. This arrangement allows the lens unit to be reduced in size, without becoming long in the radial direction of the lens. Further, this arrangement ensures that the centers of gravity of the lens and lens holder are located close to the lens driving device, and hence the center of gravity resulting from a combination of the components moved by the lens driving device can be placed close to the lens driving device, whereby more stable drive by the lens driving device is provided.

In the lens unit of the present invention, the aforementioned optical path control members can be a shutter and a diaphragm.

According to this structure, the shutter and diaphragm as the most seriously needed optical path control members are provided such that the driving sections to drive the both members sandwich the lens driving device, thus, the center of gravity of the optical path control device can be placed close to the lens driving device.

In the lens unit of the present invention, the aforementioned lens driving device can be a piezoelectric actuator.

When the piezoelectric actuator is used, the traveling distance is more likely to change under the influence of the twist of the components to be driven than when the screw feed mechanism is used. Thus, the present invention provides greater advantages when the piezoelectric actuator is used as the lens driving device.

ADVANTAGE OF THE INVENTION

As described above, in the present invention, the drive sections of the optical path control device are arranged apart from each other, and the lens driving device is placed in-between. Thus, the center of gravity of the optical path control device is arranged close to the lens driving device. When the lens driving device drives the lens, stable drive can be provided, without much torsion being caused. Further, the lens driving device and optical path control device are installed on the same side of the lens. This arrangement ensures enhanced space efficiency and allows the lens unit to be downsized.

NUMERALS

1. Lens unit
3. Lens

4. Lens holder
5. Optical path control device
8. Driven section
9. Piezoelectric actuator (lens driving device)
11. Shutter drive section (optical path control member drive section)
12. Diaphragm drive section (optical path control member drive section)
18 and 19. Shutter blade (optical path control member)
20. Diaphragm blade (optical path control member)

BEST MODE FOR CARRYING OUT THE INVENTION

The following describes an embodiment of the present invention with reference to the drawings.

Figure 1:
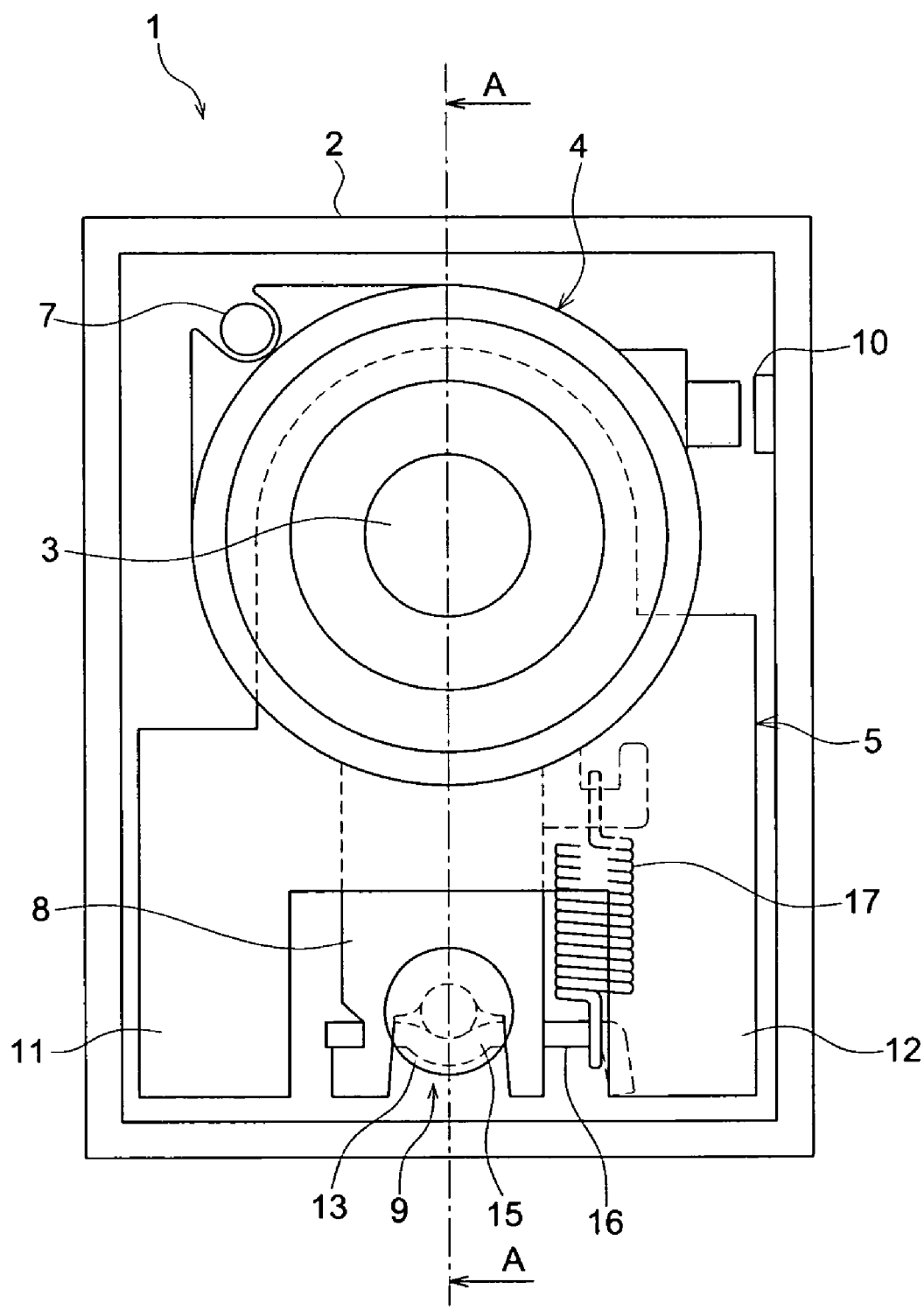
FIG. 1 is a front view of a lens unit in the embodiment of the present invention.
Figure 2:
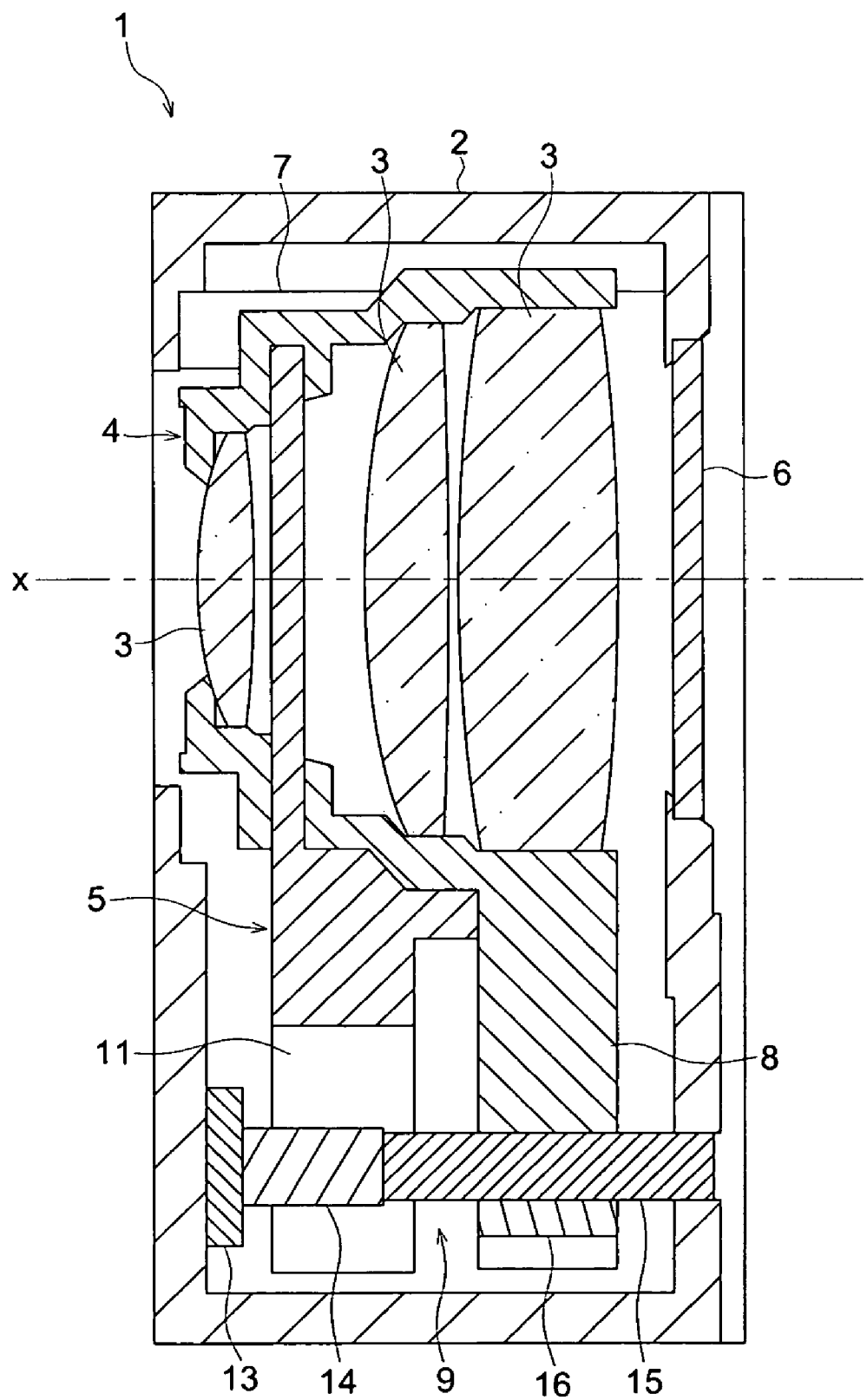
FIG. 2 is a cross sectional view of the lens unit of FIG. 1.

FIG. 1 shows a lens unit 1 as an embodiment of the present invention. FIG. 2 is a cross sectional view cut a long A-A of the lens unit 1 of FIG. 1. A lens holder 4 for holding a plurality of lens 3 is incorporated in the housing 2.

The optical path control device 5 is partially inserted into the lens holder 4 and is fixed in position. The lens 3 held by the lens holder 4 allows an image to be formed on the image pickup element 6. The lens holder 4 has a driven section 8 which is slidably engaged with a suspension shaft 7 provided on the housing 2 and expands and contracts so as to overlap with the optical path control device 5. The driven section 8 is engaged with a piezoelectric actuator 9 (lens driving device) by friction and is driven in parallel with the optical axis x. Further, the position of the lens holder 4 in the direction of the optical axis x is detected by a position sensor 10.

One end of the optical path control device 5 is inserted into the lens holder 4, and the optical path is narrowed or blocked inside the lens holder 4 by the optical path control member (to be described later). Further, the optical path control device 5 has two optical path control member drive sections 11 and 12 located outside the lens holder 4 to drive the optical path control members. The optical path control member drive sections 11 and 12 are arranged perpendicular to the axial direction of the lens 3. To conform to the arrangement of the optical path control member drive sections 11 and 12, the optical path control device 5 is formed in such a way to cut away between the optical path control member drive sections 11 and 12.

The piezoelectric actuator 9 is arranged in such a way to extend through the cutaway portion of the optical path control device 5 between the optical path control member drive sections 11 and 12. The piezoelectric actuator 9 includes a weight 13 fixed onto the housing 2; a piezoelectric element 14 with its end fixed to the weight 13; a circular drive shaft 15 with one end fixed to the other end of the piezoelectric element 14; and a retaining member 16 for engaging the driven section 8 with the drive shaft 15 by friction by sandwiching the drive shaft 1 together with the driven section 8 of the lens holder 4. The retaining member 16 uses a helical spring 17 to sandwich the drive shaft 15 between the retaining member 16 and the driven section 8.

In the piezoelectric actuator 9, the piezoelectric element 14 expands and contracts at an asymmetric speed in the direction of optical axis x with an asymmetrically fluctuating voltage applied to the piezoelectric element 14. The drive shaft 15 is oscillated asymmetrically with respect to the direction of the optical axis x by the extension and contraction of the piezoelectric element 14. When the drive shaft 15 makes a slow movement, the driven section 8 moves in the situation where it is engaged with the drive shaft 15 by friction. However, when the drive shaft 15 makes an abrupt movement, the driven section 8 makes a sliding motion with respect to the drive shaft 15 by its own inertia to keep the drive shaft in the same position. The direction and distance of the movement of the driven section 8 with respect to the drive shaft 15 can be controlled by changing the waveform of the voltage applied to the piezoelectric element 14. In this procedure, the piezoelectric actuator 9 drives the lens holder 4 containing the lens 3 together with the optical path control device 5 in the direction of the optical axis x through the driven section 8.

Figure 3:
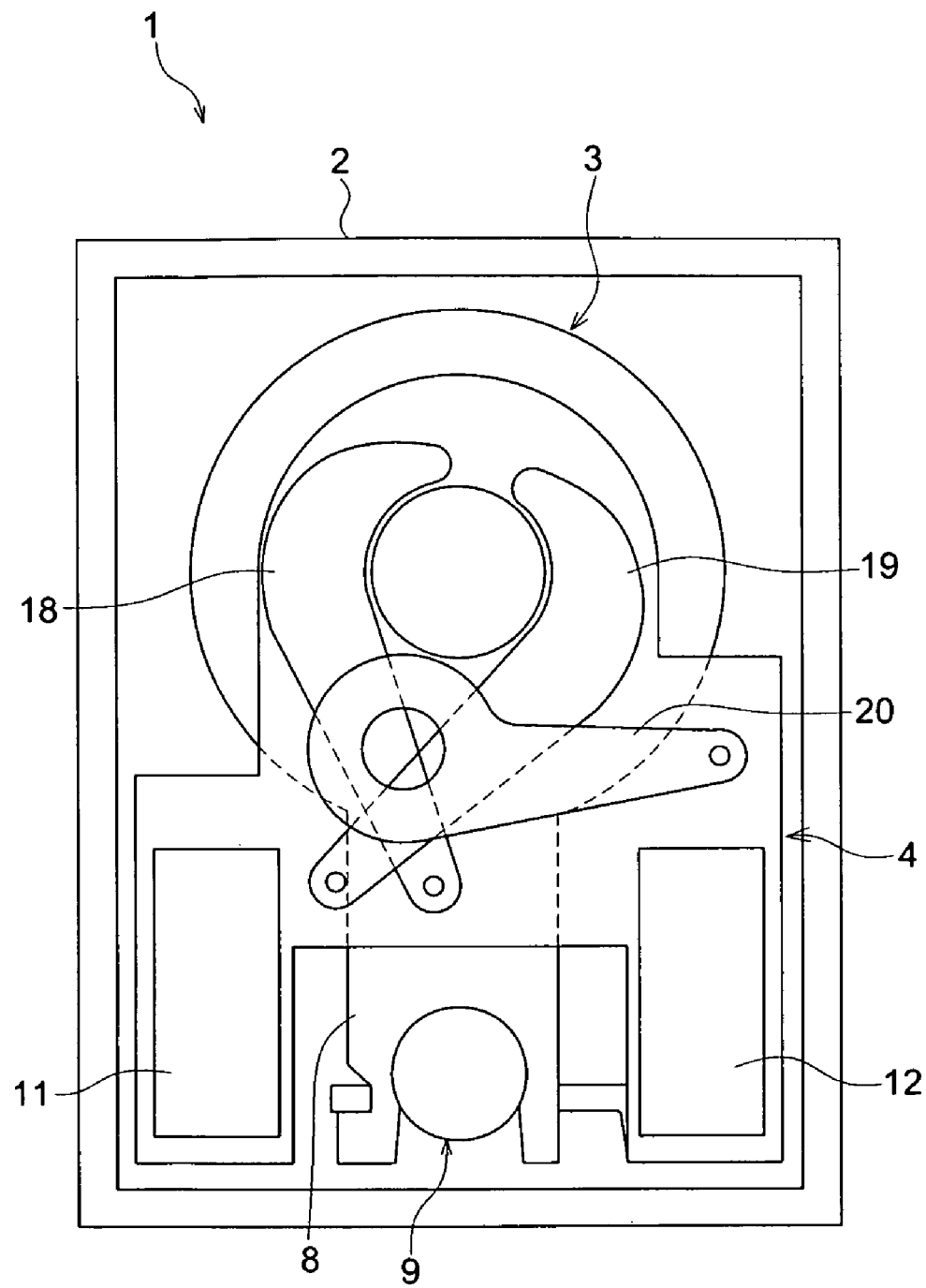
FIG. 3 is a schematic diagram showing the internal structure of the lens unit of FIG. 1.

FIG. 3 simply illustrates the internal structure of the optical path control device 5 of the lens unit 1. The optical path control device 5 has two shutter blades 18 and 19 (optical path control members) capable of blocking the optical path; and a diaphragm blade (optical path control member) capable of fine control of the optical path. The optical path control member drive section 11 of the optical path control device 5 is a shutter drive section that is made up, for example, of a solenoid for driving the shutter blades 18 and 19. The optical path control member drive section 12 is a diaphragm drive section that is made up, for example, of a solenoid for driving the diaphragm blade 20.

The following describes the advantages of the structure of the lens unit 1 formed in the aforementioned manner.

The driven section 8 for driving the lens holder 4 of the lens unit 1 in the direction of the optical axis x is arranged on the same side as the optical path control device 5 whose one end is inserted into the lens holder 4 so as to overlap with the optical path control device 5 in the direction of the optical axis x. Thus, the projected area of the lens holder 4 is reduced by overlapping the driven section 8 with the optical path control device 5 which are thinner than the lens holder 4.

The mass of the optical path control device 5 is mostly concentrated on two positions—the optical path control member drive section 11 for the shutter and the optical path control member drive section 12 for the diaphragm. As in the present embodiment, when the piezoelectric actuator 9 is arranged between the optical path control member drive section 11 for the shutter and optical path control member drive section 12 for the diaphragm, the piezoelectric actuator 9 drives the position close to the center of gravity of the optical path control device 5. This arrangement ensures stable driving because the inertial force of the optical path control device 5 does not act as the torsion when the piezoelectric actuator 9 drives.

The optical path control member drive section 11 for the shutter and optical path control member drive section 12 for the diaphragm are arranged in a perpendicular position so as to sandwich the radial line connecting the optical axis x of the lens 3 and piezoelectric actuator 9. This arrangement ensures that the optical path control member drive section 11 for the shutter and optical path control member drive section 12 for the diaphragm are not located between the lens holder 4 and piezoelectric actuator 9. This reduces the distance between the lens holder 4 and piezoelectric actuator 9, and hence the center of gravity of the lens holder 4 and lens 3 is placed closer to the piezoelectric actuator 9. Thus, this arrangement ensures stable driving because the inertial force does not act as the torsion when the piezoelectric actuator 9 drives.

It goes without saying that the torsion acting on the piezoelectric actuator 9 is produced by the overall inertia of the lens 3, lens holder 4 and optical path control device 5 driven by the piezoelectric actuator 9; accordingly, it is preferred that the optical path control member drive section 11 for the shutter and optical path control member drive section 12 for the diaphragm should be arranged to ensure that the piezoelectric actuator 9 can be provided at the closest possible position to the overall center of gravity of the lens 3, lens holder 4 and optical path control device 5, without the lens unit 1 being increased in size.

The invention claimed is:

1. A lens unit, comprising:
    a lens holder which holds a lens;
    a lens driving device for driving the lens holder along an optical axis of the lens;
    a plurality of optical path control members for controlling an optical path of the lens; and
    an optical path control device which is secured to the lens holder, the optical path control device including a plurality of optical path control member drive sections provided with a space therebetween, each of the optical path control member drive sections driving a corresponding one of the optical path control members,
    wherein the lens driving device is disposed so as to extend through between the plurality of optical path control member drive sections.

2. The lens unit of claim 1, wherein the lens unit includes two of the optical path control members, and the optical path control member drive sections are arranged so as to have therebetween a straight line in a radial direction of the lens connecting the optical axis and the lens driving device.

3. The lens unit of claim 1, wherein the optical path control members include a shutter and a diaphragm.

4. The lens unit of claim 1, wherein the lens driving device includes a piezoelectric actuator.

5. The lens unit of claim 2, wherein the optical path control members are a shutter and a diaphragm.

6. The lens unit of claim 2, wherein the lens driving device includes a piezoelectric actuator.

7. The lens unit of claim 3, wherein the lens driving device includes a piezoelectric actuator.

* * * * *